United States Patent [19]

Miller et al.

[11] Patent Number: 5,569,634
[45] Date of Patent: *Oct. 29, 1996

[54] PROCESS UPSET-RESISTANT INORGANIC SUPPORTS FOR BIOREMEDIATION

[75] Inventors: James G. Miller, Ellicott City; Michael J. Wax, Bethesda; Richard F. Wormsbecher, Highland; Leo B. Aller, Severna Park; Donald R. Durham, Gaithersburg; Alan B. Chmurny, Frederick, all of Md.

[73] Assignee: W. R. Grace & Co.-Conn., New York, N.Y.

[ * ] Notice: The term of this patent shall not extend beyond the expiration date of Pat. No. 5,403,799.

[21] Appl. No.: 354,179

[22] Filed: Dec. 12, 1994

Related U.S. Application Data

[63] Continuation-in-part of Ser. No. 997,261, Dec. 21, 1992, Pat. No. 5,403,799.

[51] Int. Cl.⁶ .............................. B01J 29/06; C02F 3/34
[52] U.S. Cl. .................. 502/64; 502/7; 502/68; 502/439; 435/176; 435/262; 435/262.5; 435/821; 210/616; 210/617
[58] Field of Search ................ 502/7, 64, 68, 502/439; 435/176, 262, 262.5, 821; 210/616, 617

[56] References Cited

U.S. PATENT DOCUMENTS

| | | | |
|---|---|---|---|
| 4,890,334 | 12/1990 | Brennan | 502/263 |
| 5,395,808 | 3/1995 | Miller et al. | 502/7 |
| 5,397,755 | 3/1995 | Parker et al. | 502/7 |
| 5,403,799 | 4/1995 | Miller et al. | 502/64 |
| 5,403,809 | 4/1995 | Miller et al. | 502/413 |

FOREIGN PATENT DOCUMENTS

| | | |
|---|---|---|
| 0155669 | 3/1985 | European Pat. Off. . |
| 0274587 | 10/1987 | European Pat. Off. . |
| 0490226 | 3/1991 | European Pat. Off. . |
| 2340909 | 2/1976 | France . |
| 8807891 | 10/1988 | WIPO . |

OTHER PUBLICATIONS

Abstract—JP 3065295 (Kankyo Kogaku Kenky) Mar. 20, 1991.

Primary Examiner—Michael Lusignan
Assistant Examiner—Timothy H. Meeks
Attorney, Agent, or Firm—Beverly J. Artale

[57] ABSTRACT

Porous bodies are produced which are suitable for use as supports for catalysts, including living cells, such as bacteria and which are upset resistant to acids and bases. The bodies have a significantly large average pore diameter of about 0.5 to 100 microns, (i.e. 5,000 to 1,000,000 Å) and a total pore volume of about 0.1 to 1.5 cc/g with the large pores contributing a pore volume of from about 0.1 to 1.0 cc/g. The bodies are made by preparing a mixture of ultimate particles containing a zeolite and one or more optional ingredients such as inorganic binders, extrusion or forming aids, burnout agents, or a forming liquid, such as water. In a preferred embodiment, the ultimate particles are formed by spray drying.

52 Claims, 4 Drawing Sheets

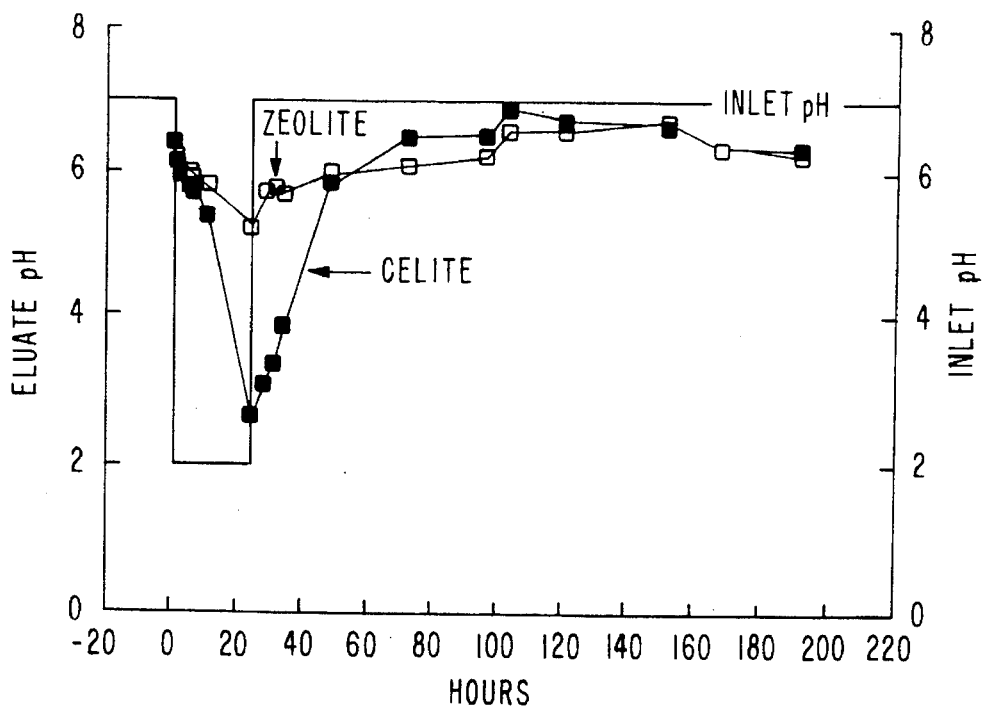
FIG. IA
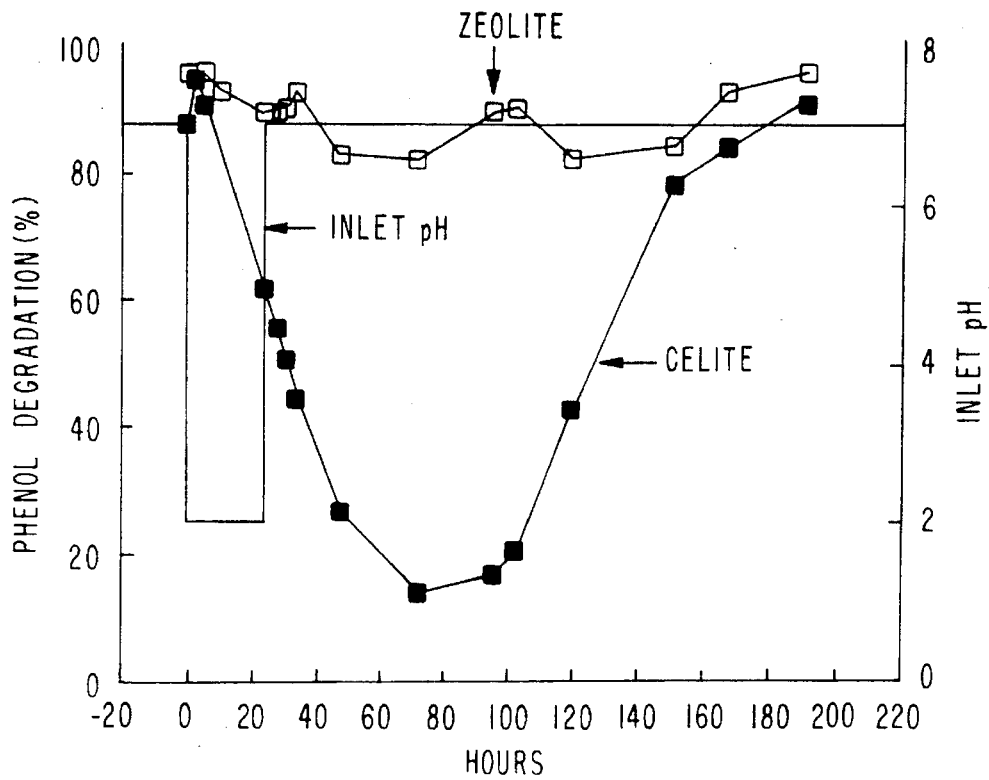
FIG. IB

PROCESS UPSET-RESISTANT INORGANIC SUPPORTS FOR BIOREMEDIATION

CROSS REFERENCE TO RELATED APPLICATIONS

This application is a continuation-in-part of U.S. Ser. No. 07/997,261, filed Dec. 21, 1992, now U.S. Pat. No. 5,403,799.

U.S. Ser. No. 07/994,222 filed Dec. 21, 1994, now U.S. Pat. No. 5,395,808 relates to clay based supports for bioremediation.

U.S. Ser. No. 07/993,745 filed Dec. 21, 1992, now U.S. Pat. No. 5,403,809 relates to composite inorganic containing supports for bioremediation.

U.S. Ser. No. 08/474,024, filed Jun. 7, 1995, now abandoned (Docket 01-9060) is a continuation of U.S. Ser. No. 07/997,261, filed Dec. 21, 1992, now U.S. Pat. No. 5,403,799.

U.S. Ser. No. 08/474,023, filed Jun. 7, 1995, now abandoned (Docket 01-9061) is a continuation of U.S. Ser. No. 07/997,261, filed Dec. 21, 1992, now U.S. Pat. No. 5,403,799.

U.S. Ser. No. 08/474,632, filed Jun. 7, 1995, now abandoned (Docket 01-9062) is a continuation of U.S. Ser. No. 07/997,261, filed Dec. 21, 1992, now U.S. Pat. No. 5,403,799.

U.S. Ser. No. 08/474,039 filed Jun. 7, 1995, now abandoned (Docket 01-9063) is a continuation of U.S. Ser. No. 07/997,261, filed Dec. 21, 1992, now U.S. Pat. No. 5,403,799.

BACKGROUND OF THE INVENTION

1. Field of the Invention
2. Description of Prior Art

Many porous inorganic supports have been made using a variety of techniques. These include sol-gel synthesis, as taught by U.S. Pat. No. 4,279,779, drying and calcination of slurries of colloidal inorganic particles, with or without the use of binders, e.g., U.S. Pat. No. 3,892,580 and pending U.S. patent application 626,599, and the use of burnout agents, taught by German Patent DE 1,907,095 [1969, Magee et al.]. However, in almost all cases the pores in these supports have been quite small, with diameters typically less than 1 μm (10,000 Å) and most often less than 1000 Å, and the preparation methods employed are not easily extended to larger pore diameters. Thus, the pore diameters described in earlier patents have been too small for some catalytic species, e.g., bacteria and other microorganisms. Further, gaseous diffusion is slow in these smaller pores. Many of the above-noted preparation methods also do not lend themselves to the preparation of bodies of arbitrary size and shape without the use of additional processing steps.

As alternatives to inorganic supports, organic materials with large pores have been made, such as macroreticular polystyrene. However, these materials often do not have good dimensional stability: they are subject to swelling in many solvents, and to being deformed under pressure. Further, organic materials often may be degraded under catalytic conditions, e.g., by extreme heat, by oxidizing conditions, or by the action of bacteria or other microorganisms.

U.S. Pat. No. 4,153,510 teaches composites of microbes bonded to the internal surfaces of large-pore inorganic materials. However, it does not teach methods of preparation or compositions which will have the desired properties.

U.S. Pat. No. 4,581,338 teaches the preparation of a spherical, large-pore, catalyst-containing support from diatomite. Large pores are introduced to the support through the addition of burnout agent during processing. Because the diatomite is relatively unreactive, added fluxing agent and high calcination temperatures are required in order to form spheres with good physical strength.

U.S. Pat. No. 3,034,994 teaches the use of extrusion of smaller particles to form macroscopic porous supports. However, if the smaller particles are not strong enough to withstand the rigors of extrusion, then they will be crushed to produce a support with low porosity. Further, if particles with insufficiently large dimensions are used, then no large pores can be formed in the interstices between these particles.

While some existing materials will serve the purpose of supporting biofilms (for example, U.S. Pat. No. 4,581,338, mentioned above), these films still are susceptible to the effects of various process upsets. For example, acid shocks often will kill all of the microorganisms present in a biofilm, so that slow recolonization by any remaining organisms or by reseeding is needed. Supports which protect the biofilms against process upsets, and particularly against pH shocks, which will be common in real systems, are desired.

Thus the existing materials and the methods for their preparation have one or more flaws. These include insufficiently large pore volume in the 0.5 to 100 micron range, difficulty in tailoring pore size to a specified range, the necessity for added burnout agents to introduce porosity, poor physical integrity or dimensional stability, difficulty in processing, and the ability to produce only specified shapes and sizes of bodies. In short, a method of preparation of supports which is easier and more readily tailored to specifications is to be desired. Further benefit would accrue from the ability to add additional reagents/catalysts/adsorbents to the support during processing, and the potential for higher cell densities or microbial activities in the finished catalyst and the ability to resist process upsets, if microbes are used as the catalytically-active species.

3. Objects of the Invention

It is an object of this invention to provide formed inorganic bodies with very large pores and good physical strength, as well as a process for their preparation.

It is a further object of this invention to provide a macroporous catalyst support.

It is a further object of this invention to provide a macroporous catalyst support with specified macropore diameters.

It is a further object of this invention to provide a macroporous catalyst support which allows more rapid diffusion of gases into the support than would be possible in a purely microporous support.

It is a further object of this invention to provide a support with pores large enough to accommodate large catalytic species.

It is a further object of this invention to provide a support for bacteria and other microorganisms.

It is a further object of this invention to provide a support for bacteria and other microorganisms which offers improved protection against process upsets.

It is a further object of this invention to provide a support for bacteria and other microorganisms which is resistant to excursions in pH.

These and other objects of the current invention will become obvious as the description below proceeds.

SUMMARY OF THE INVENTION

Porous bodies are produced which are suitable for use as supports for catalysts, including living cells, such as bacteria and which are resistant to acid and base upsets. The bodies are made from ultimate particles and are designed to have a total pore volume of 0.1 to 1.5 cc/g with large pores having an average pore diameter of about 0.5 to 100 µm, (i.e. 5,000 to 1,000,000 Å) which contribute a pore volume of from about 0.1 to 1.0 cc/g. The support bodies are made by preparing a mixture of ultimate particles and an inorganic binder component and/or other optional components. In a preferred embodiment, the ultimate particles are formed by spray drying. The mixture of ultimate particles and other ingredients is formed into bodies through extrusion, pelletization, balling, or other suitable process, and these bodies then are optionally dried and calcined.

Spaces between the ultimate particles become the pores in the finished support bodies. Calcination may be necessary to combust any organic matter which blocks these spaces. This includes optionally added burnout agents which increase the porosity by further separating the ultimate particles.

In addition to use as a support for catalysts, the porous bodies also may be useful as adsorbents or in filtration devices.

BRIEF DESCRIPTION OF THE DRAWINGS

FIG. 1 illustrates the effect of acid treatment on the performance of bioreactors containing microorganisms immobilized onto two carriers.

DETAILED DESCRIPTION OF THE INVENTION

Figure 2A:
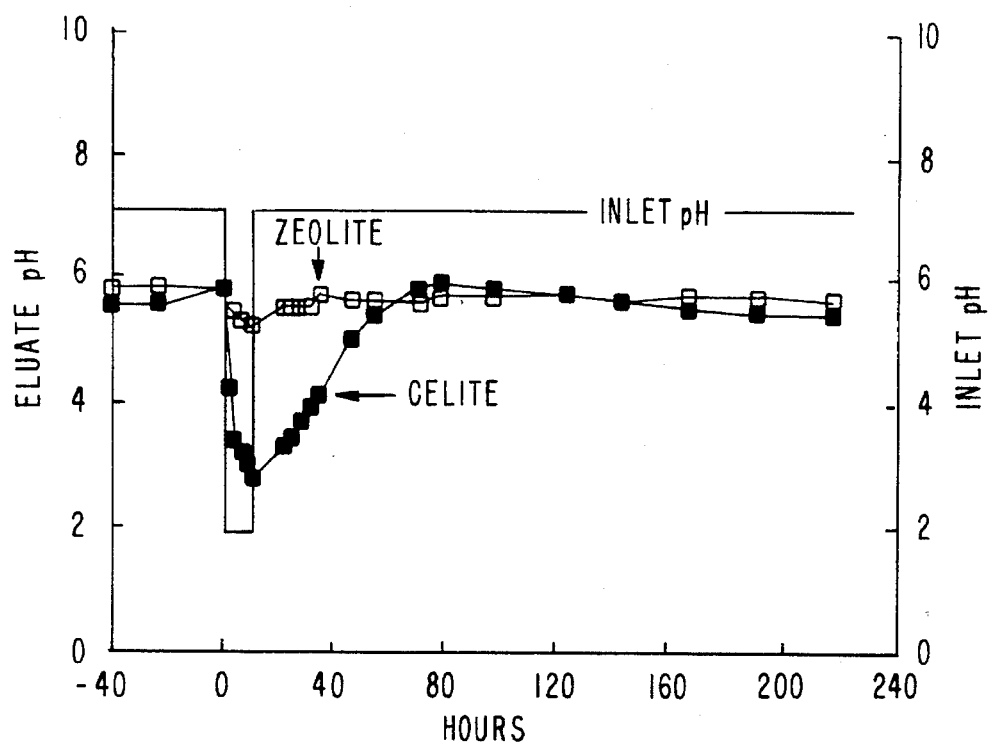
FIG. 2 illustrates the effect of an acid shock treatment on the performance of bioreactors containing microorganisms immobilized onto two carriers.

By varying the components in the preparation mixture, the properties of the finished bodies can be altered. Preferably, the finished bodies will have an average pore diameter of 0.5 to 100 µm, although the exact choice of pore diameter will depend upon the application. If, for example, rapid gaseous diffusion into the body is most important or the catalytic species is very large, a larger pore diameter will be desired. If, as a counter example, maximum surface area is necessary for catalytic activity, then a smaller pore diameter will be most appropriate, surface area being linearly related to pore diameter at constant pore volume.

The term "ultimate particles" is used herein to indicate inorganic oxide particles having a particle size of 1 to 1000 micron, which inorganic oxide contain zeolite. It is also within the scope of this invention to include a number of optional ingredients in the ultimate particles.

Zeolites are in the particles to serve several functions. Primary among these is buffering aqueous or other liquid streams contacting the finished catalyst. Zeolites typically have high cation exchange capacities, and will contain a variety of cations (metal ions and protons) in their exchange sites at neutral pH. Upon contact with a surge of acid, the zeolite in a bed of catalyst will take up protons and release other cations, thus resisting changes in the acidity of the medium. An analogous process, e.g., exchange of sodium ions into the zeolite with release of protons on exposure to caustic, also should help to prevent excursions to high pH.

Zeolites, as taught by D. W. Breck and R. A. Anderson in Kirk-Othmer: Encyclopedia of Chemical Technology, Vol 15, Third Edition, are crystalline aluminosilicate molecular sieves comprising elements of group IA and IIA. Chemically they are represented by the empirical formula $M_{2/n}O \cdot Al_2O_3 \cdot ySiO_2 \cdot wH_2O$ where y is 2 or greater, n is the cation valence, and w represents the water contained in the voids of the zeolite. Zeolite framework structures are made up of linked $AlO_4$ and $SiO_4$ tetrahedra which form channels or interconnecting voids that are occupied by cations and water molecules. The cations are mobile and ordinarily undergo ion exchange. Preferred zeolites for use in the present invention include, but are not limited to, Y, X, and A type zeolites, as is well known in the art. However, it is within the scope of the invention to use any zeolite.

Zeolites further may act as sorbents, and so remove undesired components from the stream contacting the catalyst. Such components could include water from a gas stream (removed through adsorption or absorption), or heavy metal ions from an aqueous stream (removed through ion exchange). Finally, the zeolites may act as catalysts, catalyzing, for example, fluid catalytic cracking or other acid-catalyzed reaction without the need for impregnation or loading with other catalyst species.

It will be recognized that as other materials may confer similar benefits to those of the zeolites, it is within the scope of this invention to use such materials. These include inorganic solids with ion exchange or sorption capabilities. For examples, zirconium phosphates are well-known for their ion exchange capacities, and so may be used here.

The amount of zeolite to be used may vary over a wide range, depending upon the function to be imparted, and the relative costs of the ingredients used. The amount of zeolite used in the ultimate particles is typically 80% or less; most preferably less than 30%, i.e., 30 to 0.1%.

Among the inorganic oxide components, clay is a preferred ingredient. By clay is meant any of the class of natural or synthetic hydrated aluminosilicates, with a general composition of $(Al_2O_3)_n(SiO_2)_m \cdot xH_2O$, although other elements also may be present. These aluminosilicates may be amorphous or crystalline with low ion exchange capacity. In a preferred embodiment, the clay is a natural clay such as kaolin. The amount of clay present in the ultimate particles will depend on the amount of zeolite and binder present. It can vary from about 0 to 80% and preferably from 30 to 60%.

It is within the scope of this invention to form an ultimate particle from a plurality of inorganic oxide particles and a binder. The binder serves the function of holding the inorganic oxide particles together. Binders include metal salts, oxides, and hydroxides, and their precursors and reaction products, as well as other materials, and the choice of binder will depend upon the inorganic oxide used and the manner by which it has been processed into particles. Similarly, the amount of binder necessary, if any, will be a function of the inorganic oxide. When the inorganic oxide is clay, i.e., kaolin, preferred binders are silica, silicic acid, sodium silicate, alumina, aluminum chlorohydrol, and aluminum sulfate. These binders will be present in amounts ranging from 0 to 50%, and more preferably from 0 to 25%.

Optional ingredients in the ultimate particles may include catalysts and reagents, either singly or in combination. These optional ingredients will be present in amounts ranging from 0 to 50%. Incorporation of catalyst into the ultimate particles may eliminate the need for a step to introduce catalyst to the bodies after they are formed. Alternatively, catalytic species in the ultimate particles may serve different functions than catalytic species in the pores between particles. Catalysts typically will be in the form of metals or metal oxides.

Optional reagents in the ultimate particles may serve a number of functions. These may include, but are not limited to, allowing the porous body to function as a reagent, augmenting the function of a catalytic species for which the porous body is a support, preventing microbial or fungal growth, and increasing the strength of the body. Examples of reagents are oxidants, e.g., perborate, nutrients which might enhance the growth of bacteria to be used as catalysts, and biocides if such growth is to be prevented.

The pore volume of the support also will vary with the intended application, but will range from about 0.1 to 1.5 cc/g. Pore volume in pores with diameters ranging from 0.5 to 100 μm will range from about 0.1 to 1.0 cc/g. Increased pore volumes correspond to higher surface areas (at constant pore diameter) and provide more space in which large catalyst species may reside, but also typically result in decreased crush strengths.

Size and shape of the support will be dictated by the intended use. Typical shapes include spheres, cylinders, rings, and honeycombs. Typical formed products have a diameter of at least 250 microns. Preferred combinations of size and shape are spheres or cylinders of up to 1 cm for fluidized beds; spheres, cylinders, or rings of from 1 mm to 5 cm for fixed beds; and square monoliths up to 1 m long for high space velocity applications.

In order to prevent destruction of the supports during shipping or use, they should have reasonable mechanical strengths. For supports with minimum dimensions of about 1 mm, this requirement corresponds to crush strengths greater than about five pounds, as measured using a testing machine such as the Pfizer Hardness Tester Model TM141-33, manufactured by Charles Pfizer and Co., Inc. 630 Flushing Avenue, Brooklyn, N.Y. The porous bodies, i.e., supports, are placed between two parallel plates of the machine and plates are slowly brought together by hand pressure. The amount of force required to crush the particle is registered on a dial which has been calibrated in pounds force. A sufficient number (for example, 50) of particles is crushed in order to get a statistically significant estimate for the total population. The average is calculated from the individual results. Higher crush strengths may be desirable in demanding applications. Further, for use in fluidized beds or to prevent losses during filling fixed beds, good attrition resistance is desired.

For these large size particles they should have an attrition of less than 20% and preferably less than 10% attrition. The attrition loss test involves selecting a set volume (60 cc.) of material to be tested which is placed in an inverted Erlenmeyer flask of special construction which is connected to a metal orifice inlet. A large (one inch) outlet covered with 14-mesh screening is located on the flat side (bottom) of the flask. High velocity dry nitrogen gas is passed through the inlet orifice causing the particles to: (1) circulate over one another thus causing attrition, and (2) impact themselves in the top section of the flask thus breaking down as a function of strength. The material is tested for five minutes and the remaining particles are weighed. The loss in weight after testing expressed as percent of the initial charge is designated the attrition loss.

The nitrogen flow will be in the range of about 3.5 and 4.0 cubic feet per minute, depending upon the density of the material. The flow rate must be sufficient for the particles to strike the top section of the flask. The fines produced by attrition are carried out of the flask by the nitrogen flow thus causing a loss in weight of the original material charged.

The ultimate particles may be formed by any suitable method which confers upon them the requisite physical integrity, as described below. In a preferred embodiment, the particles are produced by spray drying an aqueous mixture of the zeolite, the clay and any optional components. This route is illustrated well by U.S. Pat. No. 3,957,689 and Canadian Patent 967,136. The quantity of ultimate particles to be used will range from about 50 to 100%, and preferably from about 75 to 100%, of the total weight of the mixture used to form the porous bodies prior to the addition of any optional liquids.

Porosity is introduced to the bodies during their assembly from the ultimate particles. It is believed that the spaces between the starting particles provide the pores in the support. By changing the diameters of the ultimate particles, it is possible to change the diameters of the pores. In fact, the particle size necessary to achieve a given pore size may be estimated as follows:

$$D = \frac{3d}{2\sqrt{3} - 3},$$

where D is the particle diameter, and d is the pore diameter. This model assumes monodisperse, close-packed spherical particles. Similar relationships can be derived using other arrangements of particles of alternate shape and non-uniform size. Based upon this reasoning, ultimate particles of about 1 to 1000 μm diameter are preferred.

A key aspect of this invention is the use of zeolite containing inorganic oxide particles with sufficient physical integrity (mechanical strength and attrition resistance) to survive the forces generated in extrusion and other forming methods. If the ultimate particles do not possess the requisite physical integrity, they will be crushed, deformed, or attrited during the forming processes, with the result that the loose material will fill the interparticle spaces in the support. Thus, there will be little porosity in supports formed from soft or weak particles.

A useful measure of the physical integrity is the Davison Index for attrition for very small particles. This is determined using an Amico roller particle size analyzer fitted with a one inch (i.d.) jet cup with a 0.0625 inch orifice. In a 60 minute test at an air flow rate of 21 liters per minute on a 20+ μm sample, the Davison Index value is equal to the percentage of 0 to 20 micron-sized material formed as a fraction of the original sample. Preferably the inorganic oxide ultimate particles used in the current invention should have Davison Index values of about 20. However, Davison Index values of 70 or less are considered within the scope of the invention.

Other optional ingredients in the mixture which is to be used to produce supports of the invention are binders, extrusion or forming aids, burnout agents, and liquids, typically water. Binders will help to hold the bodies together, and typically will include metal salts, oxides, and hydroxides, and their precursors and reaction products, the choice of which will depend upon the inorganic oxide and other components present in the bodies. Preferred binders for use with kaolin-based particles are silica, silicic acid, alumina, hydrated alumina and peptized alumina. Preferably, the binder is alumina or a hydrated alumina which has been peptized with an acid. The quantity of binders to be used will range from 0 to about 50%, and preferably from 0 to about 25%, of the total weight of the mixture used to form the porous bodies prior to the addition of any optional liquids.

Extrusion and forming aids, if used, will help to ease the process used to form the supports, and may improve their green strength before calcination. Typical aids will include surfactants. A preferred extrusion aid is methyl cellulose. The quantity of optional extrusion aids to be used can range from 0 up to about 50%, and preferably up to about 25%, of the total weight of the mixture used to form the porous bodies prior to the addition of any optional liquids.

Burnout agents, if used, may impart increased porosity or pores of alternate size to the supports. Typical burnout agents include carbon and various natural and artificial polymers, such as starch and methyl cellulose. The quantity of the optional burnout agents to be used will range from 0 to about 50%, and preferably up to about 25%, of the total weight of the mixture used to form the supports prior to the addition of any optional liquids.

Finally, an optional liquid, if used, may aid forming of the supports. It also may increase porosity by leaving voids within the supports upon evaporation. A preferred liquid is water, although non-aqueous liquids may be useful in some circumstances. For example, in cases where the high surface tension of water leads to pore collapse on evaporation, lower surface tension organic liquids such as acetone may help to prevent a loss of porosity. The amount of optional liquid to be used will range from 0 to about 75% of the total weight of the ingredients used.

Useful methods for forming supports of the invention include extrusion, pelletization, balling, and granulating, among others. After being formed, the support bodies optionally may be dried and calcined. Drying will allow removal of any evaporable liquids from the bodies prior to their use, and may result in enhanced crush strength or physical integrity. Although any effective drying temperature may be used, preferred temperatures will range from room temperature to about 200° C. Suitable calcination temperatures will depend upon the function to be fulfilled by the calcination step, and the conditions to which the bodies will be subject. Suitable temperatures for complete combustion of any organic materials in the support bodies after forming will typically be in the range of 400°–700° C. For imparting greater strength to the bodies, a temperature which results in at least some sintering or vitrification of the clay and other ingredients will be necessary. Temperatures greater than about 400° C. should be suitable for this purpose.

The porous supports of the current invention may find use in a number of applications, only some of which are enumerated here. The large pores of the supports will make them particularly useful as catalyst supports for two reasons. First, the rate of gaseous diffusion in pores increases with increasing pore diameter. Thus, in the case where intraparticle diffusion limits the rate of a catalyzed reaction, use of a support with the present large pores as is described herein will enhance the rate of product formation. For example, selective catalytic reduction of nitrogen oxides with vanadium-impregnated monolith catalysts is accelerated by the introduction of large pores to the monolith, as taught by Beeckman and Hegedus in "Design of Monolith Catalysts for Power Plant $NO_x$ Emission Control," in Industrial & Engineering Chemistry Research, Volume 29, pp. 969–978, 1991.

Second, large pores in the support body will allow large catalytic species to be supported within these pores. Of particular interest is the use of living cells, e.g., bacteria, as catalysts: bacteria are large, with dimensions on the order of 1 μm or greater, and thus will not fit in smaller pores. While bacteria will form colonies on non-porous materials, the additional surface area which is available within the pores should foster larger bacterial populations. Further, bacteria in pores will be protected from transient upsets in the external medium because diffusion into the pores will be relatively slow. This is particularly true of upsets characterized by a sudden high concentration of some compound which may be toxic to the bacteria or by sudden changes in pH, ionic strength or toxic concentration of an organic or inorganic component of a waste stream. Bacteria supported on porous supports also may be resistant to longer term upsets, such as temporary oxygen or nutrient starvation caused, for example, by equipment failures.

Bacteria immobilized on porous supports will have a variety of uses. This includes the biotreatment of aqueous waste streams, and the biofiltration of gases. Other uses include bioorganic synthesis of fine and commodity chemicals, and any other use for which bacteria are suitable. The supports have a catalytically effective amount of a microorganism. The microorganism can be a bacterium and examples include Pseudomonas, Acinetobacter, Mycobacterium, Corynebacterium, Arthrobacterium, Bacillus, Flavobacterium, Nocardia, Achromobacterium, Alcaligenes, Vibrio, Azotobacter, Beijerinckia, Xanthomonas, Nitrosomonas, Nitrobacter, Methylosinus, Methylococcus, Methylobacter and actinomycetes. The microorganism can also be fungi, yeast, algae or protozoans.

The porous supports can be used in the biotreatment of an aqueous waste stream or contaminated vapor as packing materials for bioreactors. Microorganisms with specialized metabolic capabilities can be used to colonize or adhere to the porous support and thus serve as biocatalyst for the decontamination of waste streams. The porous packing of the bioreactor increases the total surface area for high microbiological cell densities which results in chemical degradation rates much higher than those of conventional waste treatment systems. The bioreactor provides a means of controlling conditions which favor microbial degradation of target compounds. For example, parameters such as pH, oxygenation, nutrient concentrations, temperature, salinity, electron donors and co-metabolic substrates can be controlled. The bioreactor can be run under anaerobic and aerobic conditions. The waste stream can enter the base of the reactor such that the flow is upward or it can enter the top of the bioreactor and the waste stream can be directed downward. Thus, the bioreactor can function as an upflow or downflow fixed film system, or alternatively, the system can function as a fluidized bed reactor.

Nutrients and gases are introduced into the system to support the growth of the microorganisms and to thus catalyze the destruction of the contaminant. Waste streams which can be degraded by microorganisms according to the present invention include aromatics, hydrocarbons, halogenated organic compounds, phenolic compounds, alcohols, ketones, carboxylic acids, ammonia, nitrates, nitrogenous organic compounds, aldehydes, ethers, esters, organosulfur compounds, organophosphorus compounds and mixtures thereof.

When used for treating aqueous waste streams or contaminated vapors the catalyst of the present invention having a microbial colonization is resistant to process upsets such as acid upset, base upset, and nutrient limitation.

Additional benefits will accrue from the presence of zeolitic molecular sieve components in the porous bodies. Bacteria and other microorganisms are susceptible to acid and base shocks; the ability of the zeolites to buffer solutions will help to prevent excursions in pH, and thus prevent such shocks. The zeolites also may protect living cells by removing toxic heavy metal ions by ion exchange.

In addition to their utility as catalyst supports, the porous bodies of the current invention will also be useful for adsorption of one or more components from gaseous or liquid mixtures, with enhanced diffusion rates giving them an advantage over conventional small-pore materials in gaseous mixtures. Further uses will include absorption of liquids and as carriers for reagents. In all of these applications, the bodies may be used without modification, or after treatment or impregnation with materials with the necessary properties.

Having described the basic aspects of our invention, the following examples are given to illustrate specific embodiments thereof.

EXAMPLE 1

This example illustrates the pilot plant-scale preparation of ¼" diameter, 1:1 aspect ratio cylindrical extrudates with macropores in the 7–9 μm range.

Nitric acid solution (5.71 lb of 70 wt % nitric acid and 104.5 lb of water) and Catapal B alumina (32.5 lb, equivalent to 22.8 lb on an anhydrous basis) were blended in a 50 gallon Sigma mixer to form a homogeneous gel. While the mixer was running, Davison Super DC (156.8 lbs of USY zeolite containing fluid catalytic cracking catalyst) was added to the gel, and the resulting mixture was again blended to homogeneity (about 10 minutes). After addition of methylcellulose (Dow Methocel 20-213, 7.81 lb) and an additional 10 minutes of blending, the mixture was extruded with a 2" Welding extruder to form ¼" pellets. These were air-dried overnight, then calcined at 550° C. for 4 hours. The product had a total pore volume (by mercury porosimetry) of 0.519 cc/cc, of which 0.314 cc/cc was in pores of 1000 Angstrom or greater diameter. The distribution of the 1000+ Angstrom pores peaked at a diameter of 7–9 μm.

EXAMPLE 2

This example illustrates the acid shock resistance of a packed column of cylindrical zeolite extrudates colonized with bacteria for the degradation of phenol.

A culture of phenol-grown *Pseudomonas aeruginosa* was pumped continuously through a 2.1 liter Kontes glass column packed with ⅛ inch extrudates until substantial biomass was evident on the extrudates. Similar treatment was used to colonized a bioreactor containing Celite (diatomaceous earth) R635 extrudates. The colonized bioreactors then received an influent stream of phenol (900 ppm) in a basal salts medium (BSM). Microorganisms in the head space of the column were recycled through the system at a 12:1 recycle ratio. Oxygen required for phenol dissimilation was introduced through the recycle line at the base of the column.

Each bioreactor received a common source of nutrients and phenol, and the degradation of phenol was 87–90% for the Celite bioreactor and 90–95% for the ⅛inch extrudates. The medium was acidified with HCl to 50 mM resulting in a pH of 1.88. The acidified medium was passed through each bioreactor for 24 hours, after which each reactor received standard medium (pH 7.2). The reduction in pH and phenol degradation was monitored in the eluate of each reactor over a 200-hour period.

As shown in FIG. 1, there is only a modest decrease in eluate pH and an insignificant alteration in phenol degradation by microorganisms from the zeolite containing reactor according to the present invention. In contrast, the eluate pH of the Celite reactor declined to 2.6 and phenol degradation decreased to 14% (FIG. 1). Thus, the acid treatment resulted in a loss of peak performance in the Celite reactor of approximately five days whereas the zeolite containing bioreactor according to the present invention degraded phenol at greater than 90% efficiency for the duration of the experiment.

EXAMPLE 3

This example also illustrates the acid shock resistance of a packed column of cylindrical zeolite extrudates colonized with bacteria for the degradation of phenol.

In a manner similar to Example 2, bioreactors, containing either ⅛ inch zeolite carrier or Celite carrier, received a medium containing 120 ppm P, 250 ppm N and 800 ppm phenol (pH 5.5 to 5.8); phenol degradation was >90% for each reactor before treatment. The medium was acidified with 18 mM sulfuric acid and each reactor received this acid feed for a short time period of ten hours, after which, the reactors' influent feed medium was converted to the original medium. Effluent from each reactor was assessed for phenol degradation and pH.

Figure 2B:
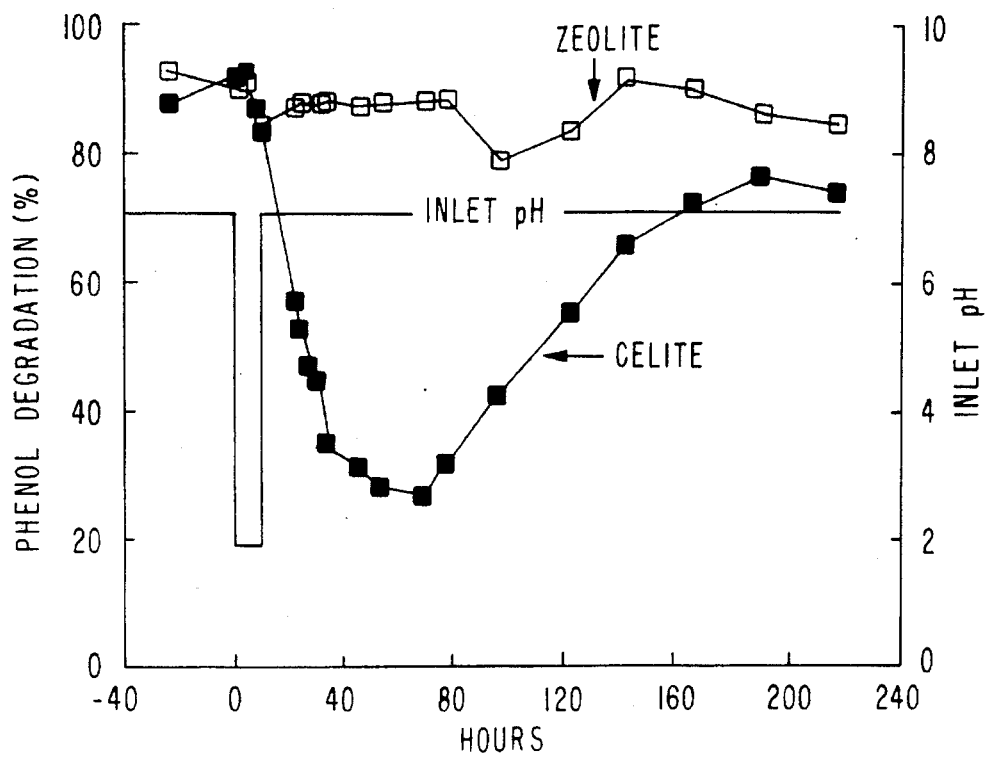

The results of this experiment are shown in FIG. 2. The effluent pH of the reactor according to the present invention never decreased below pH 5.20 (at hour 10) and phenol degradation did not decline to below 85%. The reactor demonstrated a mean of 87% phenol degradation over the 236 hour experimental period.

In contrast, the Celite reactor had an effluent pH of 2.75 at hour 10 and reactor performance decreased to 27% at hour 70. At 265 hours, the reactor had not completely recovered to its pre-acid treatment phenol degradation efficiency. For the duration of the experiment, the Celite reactor demonstrated a mean of 60% phenol degradation.

EXAMPLE 4

This example illustrates the base shock resistance of a packed column of cylindrical zeolite extrudates colonized with bacteria for the degradation of phenol.

A bioreactor containing ⅛ inch exudates colonized and functioning as described in Example 2 was subjected to a base treatment. Medium containing phenol was adjusted to pH 11 with NaOH (50 mM final concentration). The bioreactor received this medium for 72 hours. Eluate pH never increased over pH 7.5 and the degradation efficiency of phenol was greater than 90%. (See FIG. 3).

EXAMPLE 5

This example demonstrates that microorganisms colonized onto ⅛ inch zeolite extrudates are less susceptible to limitations of nutrients than microorganism colonized onto Celite.

Figure 3A:
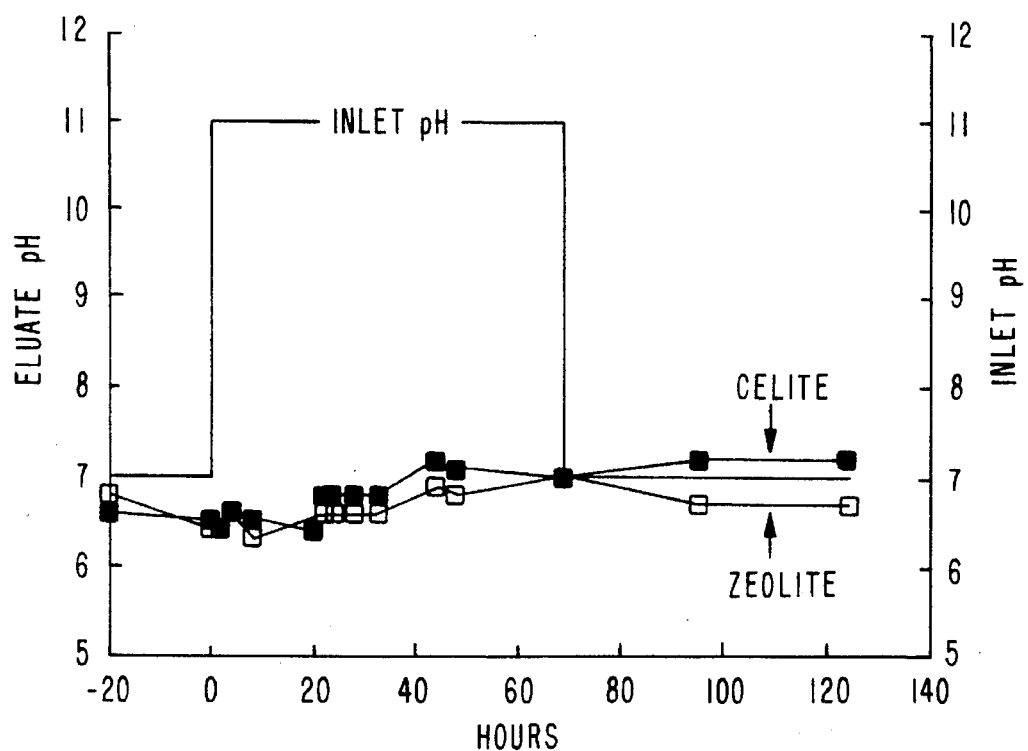
FIG. 3 illustrates the effect of a base shock treatment on the performance of bioreactors containing microorganisms immobilized onto two carriers.
Figure 3B:
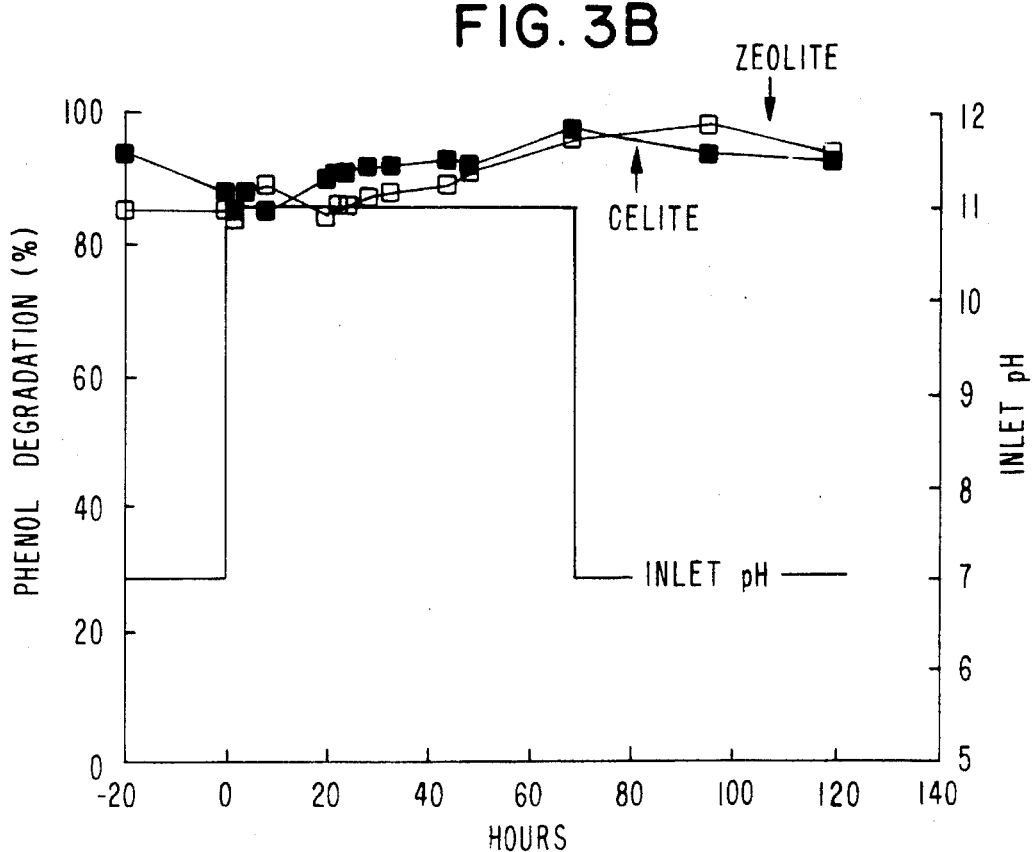
Figure 4:
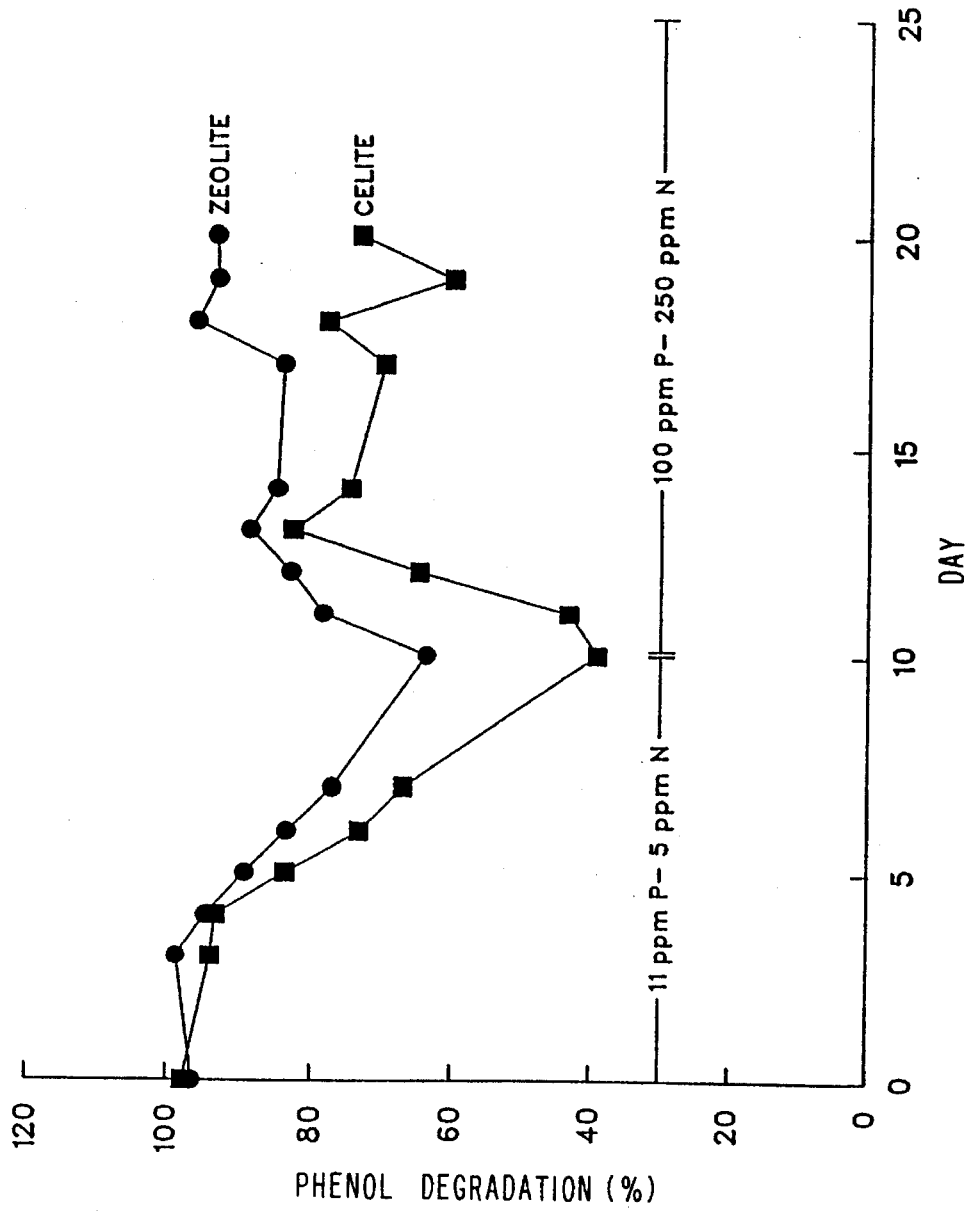
FIG. 4 illustrates the effect of nutrient starvation on the performance of bioreactors containing microorganisms immobilized onto two carriers.

Bioreactors containing microorganisms colonized onto either Celite R635 or ⅛ inch zeolite carriers were placed onto a limiting nutrient supply (e.g. 11 ppm phosphorous and 5 ppm nitrogen), and reactor performance were monitored. As illustrated in FIG. 3, after ten days, phenol degradation in the Celite reactor dropped to 40% compared to 63% for the zeolite containing reactor according to the present invention. At this point, each reactor was given an adequate nutrient supply (100 ppm phosphorous and 250 ppm nitrogen). Each reactor recovered to greater than 80% efficiency after four days. After eight additional days the bioreactor with the zeolite support degraded 97% of the phenol compared to 80% for the Celite reactor.

It is understood that the foregoing detailed description is given merely by way of illustration, and that many variations may be made therein without departing from the spirit of this invention.

What is claimed is:

1. A macroporous, upset resistant, inorganic oxide catalyst support, which support comprises a plurality of inorganic oxide particles having a particle size from 1 to 1000 microns and containing 0.1% to 80% zeolite and an inorganic binder which binds said inorganic particles together in a manner such that macropores are formed throughout the catalyst support, wherein said catalyst support has a total pore volume of 0.1 to 1.5 cc/g; macropores with pore diameters as measured by mercury porosimetry of from about 0.5 to about 100 microns, said macropores providing a pore volume of from about 0.1 to about 1.0 cc/g; and a crush resistance which is on the order of 5 pounds when measured on supports having a minimum dimension of 3 mm.

2. A catalyst support according to claim 1, wherein the inorganic oxide particles comprise clay.

3. A catalyst support according to claim 2, wherein the clay is composed of hydrated aluminosilicates.

4. A catalyst support according to claim 2, wherein the clay content of the inorganic oxide particles ranges from 30 to 60%.

5. A catalyst support according to claim 1, wherein the inorganic oxide particles comprise a plurality of inorganic particles and optionally, an inorganic binder, wherein the inorganic binder is selected from silica, silicic acid sodium silicate, alumina, a hydrated alumina, or aluminum chlorohydrol.

6. A catalyst support according to claim 5, wherein the inorganic binder in the inorganic oxide particles is present in an amount ranging from 0 to 50%.

7. A catalyst support according to claim 1, wherein the inorganic oxide particles are formed by spray drying a slurry of the inorganic oxide particles and the inorganic binder.

8. A catalyst support according to claim 1, wherein the inorganic oxide particles have a mean diameter ranging from 1 to 1000 microns.

9. A catalyst support according to claim 1, wherein the inorganic binder is present in the support in an amount ranging from up to 50%.

10. A catalyst support according to claim 9, wherein the inorganic binder is a metal salt, metal hydroxide, or metal oxide.

11. A catalyst support according to claim 10, wherein the inorganic binder is silica, silicic acid, alumina, a hydrated alumina, peptized alumina or aluminum chlorohydrol.

12. A catalyst support according to claim 2, wherein the macropores provide a pore volume of from about 0.15 to 0.6 cc/g.

13. A method of a making macroporous, upset resistant, inorganic oxide catalyst support comprising;

(i) preparing a mixture comprising a plurality of inorganic oxide particles having a particle size ranging from 1 to 1000 microns and containing 0.1% to 80% zeolite and an inorganic binder which binds said particles;

(ii) forming the mixture into a desired shape to obtain a catalyst support; and (iii) drying and calcinating the catalyst support to obtain a support having a minimum dimension of about 250 μm; a substantial amount of macropores having diameters in the range 0.5 to 100 μm and providing a pore volume of 0.1 to 1.0 cc/g; and a total pore volume of 0.1 to 1.5 cc/g; and a crush strength of at least 5 pounds when measured on bodies having a minimum dimension of 3 mm.

14. A method according to claim 13, wherein the inorganic oxide particles are present in the mixture in an amount ranging from about 50 to 100% on a liquid-free basis.

15. A method according to claim 13, wherein the inorganic particles comprise clay of synthetic hydrated aluminosilicates.

16. A method according to claim 15, wherein the clay content of the inorganic oxide particles ranges from 20 to 100%.

17. A method according to claim 13 wherein the inorganic oxide particles comprise a plurality of inorganic oxide particles and, optionally, an inorganic binder and the inorganic binder is silica, silicic acid, alumina, sodium silicate a hydrated alumina, or aluminum chlorohydrol.

18. A method according to claim 17 wherein the inorganic binder in the inorganic oxide particles is present in an amount ranging from 0 to 50%.

19. A method according to claim 13, wherein the catalyst support is formed by spray drying the mixture and forming the mixture into a desired shape.

20. A method according to claim 14, wherein the inorganic oxide particles have a mean diameter ranging from 1 to 1000 microns.

21. A method according to claim 13, wherein the inorganic binder is present in the mixture in an amount ranging from 0 to 50% on a liquid-free basis.

22. A method according to claim 13, wherein the inorganic binder is a metal salt, metal hydroxide, or metal oxide.

23. A method according to claim 22, wherein the inorganic binder is silica, silicic acid, alumina, a hydrated alumina, peptized alumina or aluminum chlorohydrol.

24. A method according to claim 23, wherein the inorganic binder is peptized alumina which has been peptized with acid.

25. A method according to claim 13, wherein the mixture further comprises an extrusion or forming aid which is present in the mixture in an amount ranging up to 25% on a liquid-free basis.

26. A method according to claim 25, wherein the extrusion or forming aid is a surfactant.

27. A method according to claim 26, wherein the extrusion or forming aid is methyl cellulose.

28. A method according to claim 13, wherein the mixture further comprises a burnout agent and the burnout agent is present in the mixture in an amount ranging up to 25% on a liquid-free basis.

29. A method according to claim 28, wherein a burnout agent is selected from the group consisting of carbon, a natural polymer, a synthetic polymer, starch and methyl cellulose.

30. A method according to claim 13, wherein the mixture further comprises a liquid and the liquid is water.

31. A method according to claim 13, wherein the support is formed by extrusion, pelletization, balling or granulation.

32. A method according to claim 13, wherein the formed support is dried at a temperature up to 200° C.

33. A method according to claim 13, wherein the dried support is calcined at a temperature between 200 and 1000° C.

34. A catalyst for the biotreatment of an aqueous waste stream or contaminated vapor comprising a catalyst support having thereon a catalytically effective amount of a micoorganism, which catalyst support comprises a plurality of inorganic oxide particles having a particle size from 1 to 1000 microns and containing 0.1% to 80% zeolite, and an inorganic binder which binds said inorganic oxide particles together in a manner such that macropores are formed throughout the catalyst support, wherein said catalyst support has a total pore volume of 0.1 to 1.5 cc/g; macropores with pore diameters as measured by mercury porosimetry of from about 0.5 to about 100 microns, said macropores providing a pore volume of from about 0.1 to about 1.0 cc/g; and a crush resistance which is on the order of 5 pounds when measured on supports having a minimum dimension of 3 mm.

35. A catalyst according to claim 34, wherein the microorganism is a bacterium selected from the group consisting of Pseudomonas, Acinetobacter, Mycobacterium, Corynebacrerium, Arthrobacterium, Bacillus, Flavobacterium, Nocardia, Achromobacterium, Alcaligenes, Vibrio, Azotobacter, Beijerinckia, Xanthomonas, Nitrosomona & Nitrobacter, Methylosinus, Methylococcus, Methylobacter and actinomycetes.

36. A catalyst according to claim 34, where the microorganism is a member selected from the group consisting of fungi, yeast, algae and protozoans.

37. A method of preparing a process upset resistant catalyst for the biotreatment of aqueous waste streams or the biofiltration of contaminated vapors comprising providing a catalyst support that is resistant to process upsets and colonizing a microorganism on at least one surface of the catalyst support, wherein said catalyst support comprises a plurality of inorganic oxide particles having a particle size from 1 to 1000 microns and containing 0.1% to 80% zeolite, and an inorganic binder which binds said inorganic oxide particles together in a manner such that macropores are formed throughout the catalyst support, wherein said catalyst support has a total pore volume of 0.1 to 1.5 cc/g; macropores with pore diameters measured by mercury porosimetry of from about 0.5 to about 100 microns, said macropores providing a pore volume of from about 0.1 to about 1.0 cc/g; and a crush resistance which is on the order of 5 pounds when measured on supports having a minimum dimension of 3 mm.

38. A method according to claim 37, wherein the process upset is an acid.

39. A method according to claim 37, wherein the process upset is a base.

40. A method according to claim 37, wherein the process upset is a nutrient limitation.

41. A method according to claim 37, wherein the process upset is a surge or spike in concentration of waste material.

42. A method according to claim 37, wherein the catalyst support is colonized with a catalytically effective mount of a microorganism.

43. A method according to claim 42, wherein the microorganism is a bacterium selected from the group consisting of Pseudomonas, Acinetobacter, Mycobacterium, Corynebacterium, Arthrobacterium, Bacillus, Flavobacterium, Nocardia, Achormobacterium, Alcaligenes, Vibrio, Azombacter, Beijerinckia, Xanthornonas, Nitrosomonas, Nitrobacter, Methylosinus, Methylococcus, Methylobacter and acthomycetes.

44. A method according to claim 42, wherein the microorganism is a member selected from the group consisting of fungi, yeast, algae and protozoans.

45. A method for biotreatment of an aqueous waste stream or contaminated vapor with a catalyst which is tolerant to acid and base upsets comprising treating the waste stream or vapor with a macroporous, upset resistant catalyst support having thereon a catalytically effective amount of a microorganism, which catalyst support comprises a plurality of inorganic oxide particles having a particle size from 1 to 1000 microns and containing 0.1% to 80% zeolite, and an inorganic binder which binds said inorganic oxide particles together in a manner such that macropores are formed throughout the catalyst support, wherein said catalyst support has a total pore volume of 0.1 to 1.5 cc/g; macropores with pore diameters as measured by mercury porosimetry of from about 0.5 to about 100 microns, said macropores providing a pore volume of from about 0.1 to about 1.0 cc/g; and a crush resistance which is on the order of 5 pounds when measured on supports having a minimum dimension of 3mm.

46. A method according to claim 45, wherein the microorganism is a bacterium selected from the group consisting of Pseudomonas, Acinetobacter, Mycobacterium, Corynebacterium, Arthrobacterium, Bacillus, Flavobacterium, Nocardia, Achormobacterium, Alcaligenes, Vibrio, Azotobacter, Beijerinckia, Xanthomonas, Nitrosomonas, Nitrobacter, Methylosinus, Methylococcus, Methylobacter and actinomycetes.

47. A method according to claim 45, wherein the microorganism is a member selected from the group consisting of fungi, yeast, algae and protozoans.

48. A method according to claim 45, wherein the support is placed in an upflow, fixed film bioreactor.

49. A method according to claim 45, wherein the support is placed in a downflow, fixed film bioreactor.

50. A method according to claim 45, wherein the support is placed in a fluidized bed bioreactor.

51. A method according to claim 45, wherein nutrients are introduced into the aqueous waste stream or contaminated vapor to support growth of the microorganisms on the catalyst support.

52. A method according to claim 45, wherein the waste stream degraded by microorganisms is selected from a group consisting of aromatics, hydrocarbons, halogenated organic compounds, phenolic compounds, alcohols, ketones, carboxylic acids, ammonia, nitrates, nitrogenous organic compounds, aldehydes, ethers, esters, organosulfur compounds, organophosphorus compounds and mixtures thereof.

* * * * *